United States Patent
Tabirian et al.

(10) Patent No.: US 11,119,257 B2
(45) Date of Patent: Sep. 14, 2021

(54) METHODS OF DIFFRACTIVE LENS AND MIRROR FABRICATION

(71) Applicants: Beam Engineering for Advanced Measurements Co., Orlando, FL (US); U.S. Government as Represented by the Secretary of the Army, Natick, MA (US)

(72) Inventors: Nelson V. Tabirian, Winter Park, FL (US); Svetlana Serak, Oviedo, FL (US); David E. Roberts, Apopka, FL (US); Diane Steeves, Franklin, MA (US); Brian Kimball, Shrewsbury, MA (US)

(73) Assignees: Beam Engineering for Advanced Measurements Co, Orlando, FL (US); U.S. Government as Represented by the Secretary of the Army, Natick, MA (US)

( * ) Notice: Subject to any disclaimer, the term of this patent is extended or adjusted under 35 U.S.C. 154(b) by 376 days.

(21) Appl. No.: 16/213,467

(22) Filed: Dec. 7, 2018

(65) Prior Publication Data
US 2020/0025987 A1 Jan. 23, 2020

Related U.S. Application Data

(60) Division of application No. 15/198,026, filed on Jun. 30, 2016, now Pat. No. 10,197,715, which is a
(Continued)

(51) Int. Cl.
*B29D 11/00* (2006.01)
*G02B 5/18* (2006.01)

(52) U.S. Cl.
CPC ...... *G02B 5/1866* (2013.01); *B29D 11/00269* (2013.01); *B29D 11/00432* (2013.01);
(Continued)

(58) Field of Classification Search
CPC ............... G02B 5/1857; G02B 5/1866; B29D 11/00269; B29D 11/00355; B29D 11/00432; B29D 11/00769
See application file for complete search history.

(56) References Cited

U.S. PATENT DOCUMENTS

| 2,435,616 A | 2/1948 | Vittum |
| 3,721,486 A | 3/1973 | Bramley |

(Continued)

FOREIGN PATENT DOCUMENTS

| EP | 1970734 | 9/2008 |
| EP | 2088456 | 12/2009 |

(Continued)

OTHER PUBLICATIONS

Anderson, G., et al., Broadband Antihole Photon Sieve Telescope, Applied Optics, vol. 16, No. 18., Jun. 2007, 3 pages.
(Continued)

*Primary Examiner* — Elizabeth A Burkhart
(74) *Attorney, Agent, or Firm* — Brian S. Steinberger; Hilary E. Steinberger; Law Offices of Brian S. Steinberger, P.A.

(57) ABSTRACT

Methods of fabricating optical lenses and mirrors, systems and composite structures based on diffractive waveplates, and fields of application of said lenses and mirrors that include imaging systems, astronomy, displays, polarizers, optical communication and other areas of laser and photonics technology. Diffractive lenses and mirrors of shorter focal length and larger size, with more closely spaced grating lines, and with more exacting tolerances on the optical characteristics, can be fabricated than could be fabricated by previous methods.

9 Claims, 9 Drawing Sheets

Related U.S. Application Data continuation-in-part of application No. 14/214,375, filed on Mar. 14, 2014, now Pat. No. 10,114,239, which is a continuation-in-part of application No. 13/860,934, filed on Apr. 11, 2013, now abandoned, which is a continuation of application No. 12/662,525, filed on Apr. 21, 2010, now abandoned.

(60) Provisional application No. 62/186,749, filed on Jun. 30, 2015, provisional application No. 61/801,251, filed on Mar. 15, 2013.

(52) U.S. Cl.
CPC ...... B29D 11/00769 (2013.01); G02B 5/1857 (2013.01); B29D 11/00355 (2013.01)

(56) References Cited

U.S. PATENT DOCUMENTS

| | | | |
|---|---|---|---|
| 3,897,136 A | 7/1975 | Bryngdahl | |
| 4,160,598 A | 7/1979 | Firester et al. | |
| 4,301,023 A | 11/1981 | Schuberth | |
| 4,698,816 A | 10/1987 | Chun | |
| 4,956,141 A | 9/1990 | Allen | |
| 4,983,332 A | 1/1991 | Hahn | |
| 5,032,009 A | 7/1991 | Gibbons | |
| 5,042,950 A | 8/1991 | Salmon, Jr. | |
| 5,047,847 A | 9/1991 | Toda | |
| 5,100,231 A | 3/1992 | Sasnett et al. | |
| 5,142,411 A | 8/1992 | Fiala | |
| 5,150,234 A | 9/1992 | Takahashi | |
| 5,218,610 A | 6/1993 | Dixon | |
| 5,321,539 A | 6/1994 | Hirabayashi | |
| 5,325,218 A | 6/1994 | Willett | |
| 5,446,596 A | 8/1995 | Mostrorocco | |
| 5,619,325 A | 4/1997 | Yoshida | |
| 5,621,525 A | 4/1997 | Vogeler et al. | |
| 5,712,721 A | 1/1998 | Large | |
| 5,895,422 A | 4/1999 | Hauber | |
| 5,903,330 A | 5/1999 | Funschilling | |
| 5,907,435 A | 5/1999 | Ang | |
| 5,989,758 A | 11/1999 | Komatsu | |
| 6,091,471 A | 7/2000 | Kim | |
| 6,107,617 A | 8/2000 | Love et al. | |
| 6,139,147 A | 10/2000 | Zhang | |
| 6,170,952 B1 | 1/2001 | La Haye et al. | |
| 6,191,880 B1 | 2/2001 | Schuster | |
| 6,219,185 B1 | 4/2001 | Hyde | |
| 6,320,663 B1 | 11/2001 | Ershov | |
| 6,373,549 B1 | 4/2002 | Tombling et al. | |
| 6,452,145 B1 | 9/2002 | Graves et al. | |
| 6,551,531 B1 | 4/2003 | Ford | |
| 6,678,042 B2 | 1/2004 | Tabirian et al. | |
| 6,728,049 B1 | 4/2004 | Tabirian et al. | |
| 6,792,028 B2 | 9/2004 | Cook | |
| 6,810,169 B2 | 10/2004 | Bouevitch | |
| 6,911,637 B1 | 6/2005 | Vorontsov et al. | |
| 7,048,619 B2 | 5/2006 | Park | |
| 7,094,304 B2 | 8/2006 | Nystrom | |
| 7,095,772 B1 | 8/2006 | Delfyett et al. | |
| 7,196,758 B2 | 3/2007 | Crawford | |
| 7,319,566 B2 | 1/2008 | Prince | |
| 7,324,286 B1 | 1/2008 | Glebov | |
| 7,450,213 B2 | 11/2008 | Kim et al. | |
| 7,482,188 B2 | 1/2009 | Moon | |
| 7,764,426 B2 | 7/2010 | Lipson | |
| 8,045,130 B2 | 10/2011 | Son | |
| 8,077,388 B2 | 12/2011 | Gerton | |
| 8,264,623 B2 | 9/2012 | Marrucci | |
| 8,520,170 B2 | 8/2013 | Escuti | |
| 8,582,094 B1 | 11/2013 | Shortt | |
| 8,643,822 B2 | 2/2014 | Tan et al. | |
| 8,937,701 B2 | 1/2015 | Rossini | |
| 8,982,313 B2 | 3/2015 | Escuti et al. | |
| 9,535,258 B1 | 1/2017 | Whiteaker | |
| 9,541,772 B2 | 1/2017 | De Sio et al. | |
| 9,557,456 B2 | 1/2017 | Tabirian et al. | |
| 9,592,116 B2 | 3/2017 | De Sio et al. | |
| 9,617,205 B2 | 4/2017 | Tabirian et al. | |
| 9,658,512 B2 | 5/2017 | Tabirian et al. | |
| 9,715,048 B2 | 7/2017 | Tabirian et al. | |
| 9,753,193 B2 | 9/2017 | Tabirian et al. | |
| 9,976,911 B1 | 5/2018 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 10,075,625 B2 | 9/2018 | Tabirian et al. | |
| 10,107,945 B2 | 10/2018 | Tabirian et al. | |
| 10,114,239 B2 * | 10/2018 | Tabirian | G02F 1/133365 |
| 10,120,112 B2 | 11/2018 | Tabirian et al. | |
| 10,185,182 B2 | 1/2019 | Tabirian | |
| 10,191,191 B2 | 1/2019 | Tabirian et al. | |
| 10,191,298 B2 | 1/2019 | Tabirian et al. | |
| 10,197,715 B1 | 2/2019 | Tabirian et al. | |
| 10,274,650 B2 | 4/2019 | Tabirian et al. | |
| 10,274,805 B2 | 4/2019 | Tabirian et al. | |
| 10,330,947 B2 | 6/2019 | Tabirian et al. | |
| 2001/0002895 A1 | 6/2001 | Kawano | |
| 2001/0018612 A1 | 8/2001 | Carson et al. | |
| 2001/0030720 A1 | 10/2001 | Ichihashi | |
| 2002/0027624 A1 | 3/2002 | Seiberle | |
| 2002/0097361 A1 | 7/2002 | Ham | |
| 2002/0167639 A1 | 11/2002 | Coates | |
| 2003/0021526 A1 | 1/2003 | Bouevitch | |
| 2003/0072896 A1 | 4/2003 | Kwok | |
| 2003/0086156 A1 | 5/2003 | McGuire | |
| 2003/0137620 A1 | 7/2003 | Wang | |
| 2003/0152712 A1 | 8/2003 | Motomura | |
| 2003/0206288 A1 | 11/2003 | Tabirian et al. | |
| 2003/0214700 A1 | 11/2003 | Sidorin | |
| 2003/0218801 A1 | 11/2003 | Korniski et al. | |
| 2004/0051846 A1 | 3/2004 | Blum et al. | |
| 2004/0081392 A1 | 4/2004 | Li | |
| 2004/0105059 A1 | 6/2004 | Ohyama | |
| 2004/0165126 A1 | 8/2004 | Ooi et al. | |
| 2005/0030457 A1 | 2/2005 | Kuan et al. | |
| 2005/0110942 A1 | 5/2005 | Ide | |
| 2005/0219696 A1 | 10/2005 | Albert et al. | |
| 2005/0271325 A1 | 12/2005 | Anderson et al. | |
| 2005/0276537 A1 | 12/2005 | Frisken | |
| 2005/0280717 A1 | 12/2005 | Chen | |
| 2006/0008649 A1 | 1/2006 | Shinichiro | |
| 2006/0055883 A1 | 3/2006 | Morris et al. | |
| 2006/0109532 A1 | 5/2006 | Savas | |
| 2006/0221449 A1 | 10/2006 | Glebov et al. | |
| 2006/0222783 A1 | 10/2006 | Hayashi | |
| 2007/0019179 A1 | 1/2007 | Fiolka et al. | |
| 2007/0032866 A1 | 2/2007 | Portney | |
| 2007/0040469 A1 | 2/2007 | Yacoubian | |
| 2007/0115551 A1 | 5/2007 | Spilman | |
| 2007/0122573 A1 | 5/2007 | Yasuike | |
| 2007/0132930 A1 | 6/2007 | Ryu et al. | |
| 2007/0247586 A1 | 10/2007 | Tabirian | |
| 2007/0258677 A1 | 11/2007 | Chigrinov | |
| 2008/0024705 A1 | 1/2008 | Hasegawa et al. | |
| 2008/0226844 A1 * | 9/2008 | Shemo | G03F 7/70966 428/1.1 |
| 2008/0278675 A1 | 11/2008 | Escuti | |
| 2009/0002588 A1 | 1/2009 | Lee et al. | |
| 2009/0052838 A1 | 2/2009 | McDowall | |
| 2009/0073331 A1 | 3/2009 | Shi | |
| 2009/0122402 A1 | 5/2009 | Shemo | |
| 2009/0141216 A1 | 6/2009 | Marrucci | |
| 2009/0201572 A1 | 8/2009 | Yonak | |
| 2009/0256977 A1 | 10/2009 | Haddock | |
| 2009/0257106 A1 | 10/2009 | Tan | |
| 2009/0264707 A1 | 10/2009 | Hendricks | |
| 2010/0003605 A1 | 1/2010 | Gil | |
| 2010/0066929 A1 | 3/2010 | Shemo | |
| 2010/0245954 A1 | 9/2010 | Ahling | |
| 2011/0069377 A1 | 3/2011 | Wu et al. | |
| 2011/0075073 A1 | 3/2011 | Oiwa | |
| 2011/0085117 A1 | 4/2011 | Moon et al. | |

(56) References Cited

U.S. PATENT DOCUMENTS

| | | |
|---|---|---|
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers |
| 2011/0262844 A1 | 10/2011 | Tabirian |
| 2012/0075168 A1 | 3/2012 | Osterhout et al. |
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0011564 A1 | 1/2016 | Tanabe et al. |
| 2016/0023993 A1 | 1/2016 | Tabirian |
| 2016/0047955 A1 | 2/2016 | Tabirian et al. |
| 2016/0047956 A1 | 2/2016 | Tabirian et al. |
| 2016/0161648 A1* | 6/2016 | Gu .................. G02B 5/1857 430/2 |
| 2016/0209560 A1 | 7/2016 | Tabirian et al. |
| 2016/0231592 A9 | 8/2016 | Beaton et al. |
| 2016/0270656 A1 | 9/2016 | Samec et al. |
| 2016/0282639 A1 | 9/2016 | von und zu Liechtenstein |
| 2016/0363484 A1 | 12/2016 | Barak et al. |
| 2016/0363783 A1 | 12/2016 | Blum |
| 2017/0010397 A1 | 1/2017 | Tabirian et al. |
| 2017/0307892 A1 | 10/2017 | Freeman et al. |
| 2019/0113377 A1 | 4/2019 | Johnston et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Early, J. et al., Twenty Meter Space Telescope Based on Diffractive Fresnel Lens, SpPIE, U.S. Department of Energy, Lawrence Livermore National Laboratory, Jun. 2003, 11 pages.

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, no., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2007), 4 pages.

Nersisyan, S., et al., Polarization insensitive imaging through polarization gratins, Optics Express, vol. 17, No. 3, Feb. 2, 2009, 14 pages.

Oise, Optics in the Southeast, Technical Conference and Tabletop Exhibit, Optical Society of America, Orlando, FL., Nov. 12-13, 2003, 9 pages.

Dierking, Polymer Network-Stabilized Liquid Crystals, Advanced Materials, vol. 12, No. 3, 2000, 15 pages.

Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.

Marrucci, et al., Pancharatnam-Berry phase optical elements for wave front shaping in the visible domain, Appl. Phys. Lett. 88, 2006, 3 pages.

Sobolewska et al., "On the inscription of period and half period surface relief gratings in azobenzene-functionalized polymers", J. Phys. Chem., vol. 112 (15) Jan. 3, 2008, 10 pages.

Barrett et al., Model of laser driven mass transport in thin films of dye-functionalized polymers, J. Chem. Phys., vol. 109 (4), Jul. 22, 1998, 13 pages.

Vernon, J., et al, Recording Polarization Gratings with a Standing Spiral Wave, Applied Physics Letters, Oct. 2013, vol. 103, 4 pages.

Gerchberg, et al, practical algorithm for the determination of the phase from image and diffraction plane pictures, 1972, Optik, vol. 35, Issue 2, pp. 237-246, 10 pages.

Serak, et al. Diffractive Waveplate Arrays [Invited], Journal of the Optical Society of America B, May 2017, pp. B56-B63, vol. 34, No. 5, 8 pages.

Emoto, Optical and Physical Applications of Photocontrollable Materials: Azobenzene-Containing and Liquid Crystalline Polymers, Polymers,Jan. 2012, 150-186, vol. 4, 38 pages.

Roberts, D. et al, "Polarization-Independent Diffractive Waveplate Optics," Mar. 2018, IEEE Aerospace Conference, 11 pages.

Pepper, M. et al, Nonlinear Optical Phase Conjugation, IEEE, Sep. 1991, pp. 21-34, 14 pages.

De Sio, L., et al., "Digital Polarization Holography Advancing Geometrical Phase Optics," 2016, Optics Express, vol. 24, Issue 16, pp. 18297-18306, 10 pages.

Borek, G. and D. Brown, "High-performance diffractive optics for beam shaping," 1999, Proceeding of SPIE, vol. 3633, pp. 51-60, 10 pages.

Tabiryan, et al., The Promise of Diffractive Waveplates, OPN Optics and Photonics News, Mar. 2010, 6 pages.

Tabiryan, et al., Fabricating Vector Vortex Waveplates for Coronagraphy; Aerospace Conference, 2012, EEE; publicly available Apr. 19, 2012, 12 pages.

Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.

Nersisyan, et al., Study of azo dye surface command photoalignment material for photonics applications, Applied Optics, vol. 49, No. 10, Apr. 1, 2010, 8 pages.

Nersisyan, et al., Characterization of optically imprinted polarization gratings, Applied Optics, vol. 48, No. 21, Jul. 20, 2009, 6 pages.

Nersisyan, et al., Fabrication of Liquid Crystal Polymer Axial Waveplates for UV-IR Wavelengths, Optics Express, vol. 17, No. 14, Jul. 2009, 9 pages.

Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.

Nersisyan, et al., Polarization insensitive imaging through polarization gratings, Optics Express, vol. 17, No. 3, Feb. 2, 2009, 14 pages.

Sarkissian, et al., Longitudinally modulated nematic bandgap structure, Optical Society of America, vol. 23, No. 8, Aug. 2008, 6 pages.

Sarkissian, et al., Polarization-universal bandgap in periodically twisted nematics, Optics Letters, vol. 31, No. 11, Jun. 1, 2006, abstract, 4 pages.

Sarkissian, et al., Periodically Aligned Liquid Crystal: Potential Application for Projection Displays, Mol. Cryst. Liq. Cryst, vol. 451, 2006, 19 pages.

Sarkissian, et al., Potential application of Periodically Aligned Liquid Crystal cell for projection displays, JThE12, 2005, 3 pages.

Sarkissian, et al., Polarization-Controlled Switching Between Diffraction Orders in Transverse-Periodically Aligned Nematic Liquid Crystals, Optics Letters, Aug. 2006, abstract, 4 pages.

(56) References Cited

OTHER PUBLICATIONS

Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Then, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No., 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, vol. 42, 2003, 3 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microrubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.

* cited by examiner

METHODS OF DIFFRACTIVE LENS AND MIRROR FABRICATION

CROSS REFERENCE TO RELATED APPLICATIONS

This application is a Divisional Patent Application of U.S. patent application Ser. No. 15/198,026 filed Jun. 30, 2016, now U.S. Pat. No. 10,197,715, which claims the benefit of priority to U.S. Provisional Patent Application Ser. No. 62/186,749 filed Jun. 30, 2015, and U.S. patent application Ser. No. 15/198,026 filed Jun. 30, 2016 is a Continuation-In-Part of U.S. patent application Ser. No. 14/214,375 filed Mar. 14, 2014, now U.S. Pat. No. 10,114,239, which claims the benefit of priority to U.S. Provisional Patent Application Ser. No. 61/801,251 filed Mar. 15, 2013, and U.S. patent application Ser. No. 14/214,375 filed Mar. 14, 2014 is a Continuation-In-Part of U.S. patent application Ser. No. 13/860,934 filed Apr. 11, 2013, now Abandoned, which is a Continuation of U.S. patent application Ser. No. 12/662,525 filed Apr. 21, 2010, now Abandoned. The entire disclosure of each of the applications listed in this paragraph is incorporated herein by specific reference thereto.

GOVERNMENT LICENSE RIGHTS

This invention was made with Government support under U.S. Army contract W911QY-13-C-0049. The government has certain rights in the invention.

FIELD OF INVENTION

This invention relates to optical lenses and mirrors, and in particular to methods of fabrication of optical lenses and mirrors based on diffractive waveplates, systems, composite structures and fields of application of said lenses and mirrors that include imaging systems, astronomy, displays, polarizers, optical communication and other areas of laser and photonics technology.

BACKGROUND AND PRIOR ART

Methods are available from prior art for the fabrication of lenses and mirrors based on diffractive waveplates. However, some applications require that the diffractive waveplate lenses and mirrors be larger in size, have shorter focal length, and have more closely spaced grating lines than is achievable based on prior art techniques. Also, with presently-available fabrication techniques, imperfections in the fabricated parts prevent their use in certain applications that require close tolerances. Therefore there is a need for methods of fabrication of diffractive waveplate lenses and mirrors with larger size, shorter focal length, finer grating spacing, and more exact correspondence between the design and the fabricated parts than is achievable with said prior art.

The lenses and mirrors that are used as examples in the present disclosure have circular symmetry, but the methods disclosed herein are applicable to other device structures. The techniques disclosed herein for achieving diffractive waveplate devices with finer grating patterns than are achievable using prior art (i.e. grating patterns with grating lines more closely spaced than are achievable with prior art) are applicable to many other geometrical arrangements as well. For example, these techniques could also be applied to lenses or mirrors in which the optical axis orientation pattern, instead of having circular symmetry, has cylindrical symmetry.

Thus, the need exists for solutions to the above problems with the prior art.

SUMMARY OF THE INVENTION

A primary objective of the present invention is to provide methods for fabricating diffractive lenses and mirrors, systems and composite structures, with larger size, shorter focal length, and with more closely spaced grating lines, than is achievable with methods from prior art.

A second objective of the present invention is to provide methods for fabricating diffractive waveplate lenses, systems and composite structures, with more exacting optical tolerances than are achievable with methods from prior art.

A third objective of the present invention is to provide optical lenses and mirrors based on diffractive waveplates, systems and composite structures, and fields of application of said lenses and mirrors that include imaging systems, astronomy, displays, polarizers, optical communication and other areas of laser and photonics technology.

A method for fabricating diffractive waveplate lenses and mirrors can be a replication method in which an alignment layer for the replicated diffractive waveplate lens is photoaligned by propagating an initially collimated laser beam through a master diffractive waveplate lens in close proximity to the alignment layer of the replicated diffractive waveplate lens or mirror.

A method of fabricating diffractive waveplate lenses and mirrors can involve propagation of an initially collimated laser beam through a birefringent medium such as a nematic liquid crystal, with the birefringent medium confined in a nearly planar region in which one boundary of the confined region is bounded on one side by a solid transparent material having the shape of a Fresnel lens.

A method of fabricating diffractive waveplate lenses and mirrors can include creation of a photoaligned alignment layer with an interferometer in which light of one linear polarization propagates in one arm of the interferometer, light of the orthogonal linear polarization propagates in the other arm of the interferometer, with a master lens in one arm of the interferometer, and a quarter-wave plate at the output of the interferometer to convert circularly polarized light to linearly polarized light.

A method of fabricating diffractive waveplate lenses can include creation of a photoaligned alignment layer by means of interference between a transmitted laser beam and beam that has been transmitted through a lens and reflected from a mirror.

The present invention includes a method of achieving shorter focal lengths than are available by means of prior art by stacking multiple diffractive waveplate lenses with alternating sign of the radial dependence of optical axis orientation on distance from the center of the lenses.

A method of replicating a diffractive waveplate lens such that the size of the replicated optical component is the same as that of the diffractive waveplate lens from which it is replicated, and such that the focal length of the replicated optical component is half that of the diffractive waveplate lens from which it is replicated, the method can include the steps of producing a collimated linearly polarized laser beam, arranging a diffractive waveplate lens on the path of the beam, producing a substrate coated with a photoalignment layer, placing the substrate in close proximity to said diffractive waveplate lens, and exposing the substrate to the laser beam propagated through the diffractive waveplate lens to produce a photoalignment pattern of optical anisotropy axis orientation in the photoalignment layer.

The method can further include the step of deposition of at least a single layer of a liquid crystal polymer film on the photoaligned substrate having a thickness approximately half of the minimum feature size in the photoalignment pattern.

A composite structure can include two or more diffractive waveplate lenses, arranged such that a focal power of the composite structure is a sum of focal powers of individual diffractive waveplate lenses comprising the composite structure.

Each of the individual diffractive waveplate lenses can consist of a substrate with the waveplate lens deposited as a coating over the substrate.

All of the two or more waveplate lenses can be contained in a sandwich structure of multiple layers on a single substrate.

A composite structure can include diffractive waveplate layers on a single flat mirror substrate, such that the focal power of the mirror with the composite structure of diffractive waveplate layers has a focal power equal to the sum of the focal powers of each of the individual diffractive waveplate layers comprising the composite structure.

A method for creating an alignment layer usable for fabricating a diffractive waveplate lens, can include the steps of generating a monochromatic, linearly-polarized incident beam of radiation, converting said linearly-polarized radiation to circular polarization with a first quarter wave plate, providing a circularly-symmetric assembly containing a birefringent layer; producing a selected dependence of optical retardation on radial distance from the center of said assembly, with the circularly polarized light from said quarter-wave plate incident on said assembly, producing discontinuities of an integral number of waves in the optical path difference with said birefringent layer, and converting beam output from said assembly from circular polarization to linear polarization with a second quarter wave plate; and providing a thin film of material that is photoaligned by the linearly polarized output of said second quarter-wave plate.

The birefringent layer can consist of a layer of liquid crystal between two solid substrates, one of which is flat, and the other of which has physical discontinuities that result in optical path difference discontinuities of an integer multiple of wavelengths; with a liquid crystal layer aligned in the same direction throughout said birefringent layer. The birefringent layer can consist of a thin solid crystalline layer placed on a solid optical substrate, with the optical axis of said birefringent layer aligned in the same direction throughout said birefringent layer.

A system for creating an alignment layer usable for fabricating a diffractive waveplate lens, the system can include a monochromatic, linearly-polarized incident beam of radiation, a half-wave plate to allow adjustment of the fraction of the input beam that is propagated into each path in an interferometer, a combination of polarizing beamsplitters and mirrors comprising an interferometer, such that incident radiation is divided between the two paths of the interferometer, then recombined at the output of the interferometer, with the fraction of radiation propagating into each arm of the interferometer being adjusted by means of rotation of said half-wave plate about the axis of the incident beam, an optical element such as a lens placed into one arm of the interferometer, a quarter-wave plate to convert the combined beam output from said interferometer from circular polarization to linear polarization, and a thin film of material that is photoaligned by the linearly polarized output of said second quarter-wave plate.

A system, for creating an alignment layer usable for fabricating a diffractive waveplate lens, the system can include a monochromatic, linearly-polarized incident beam of radiation, a quarter-wave plate rotated about the optical axis of the incident beam such that the incident beam is converted from linear polarization to circular polarization, an alignment layer consisting of a material that is susceptible to photoalignment by linearly polarized radiation, on a transparent substrate, a quarter-wave plate for converting the incident beam from circular polarization to linear polarization, and for converting a reflected beam from linear polarization to circular polarization, and a lens and mirror for reflecting the linearly-polarized beam and imposing an optical phase shift that depends on the radial coordinate.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
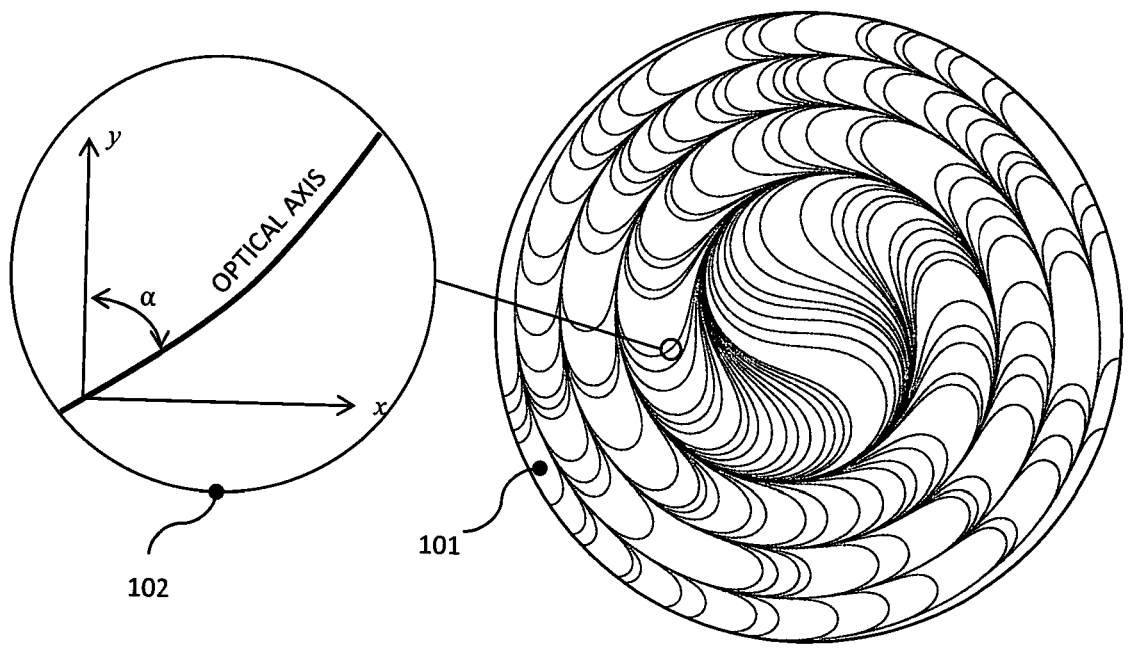
FIG. 1 shows a prior art pattern of optical axis orientation as a function of transverse position over the surface of a diffractive waveplate lens or mirror.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention relates to use of methods for creating diffractive waveplate lenses and lens combinations, and diffractive waveplate mirrors and mirror combinations, that have shorter focal length than waveplate lenses and waveplate mirrors created using prior art. The term "waveplate lens" as used herein describes a thin film of birefringent material deposited on a transparent solid structure, for example, a thin flat substrate of optical material such as glass or transparent plastic. The substrate can be rigid or flexible.

This birefringent film has the property that it retards the phase of light of one linear polarization by approximately one half wave (pi radians of optical phase) relative to the light of the other linear polarization. The thickness L of the film is defined by the half-wave phase retardation condition $L=(\lambda/2)/(n_e-n_o)$, where $n_e$ and $n_o$ are the principal values of the refractive indices of the material, and $\lambda$ is the radiation wavelength. In waveplate lenses, the optical axis orientation depends on the transverse position on the waveplate, i.e. the position in the two coordinate axes perpendicular to the surface of the waveplate lens. In other words, the optical axis orientation is modulated in one or both of the transverse directions parallel to the surface of the substrate on which the active thin film is applied.

As is known from prior art, diffractive waveplate lenses and mirrors can be used to transform light beams in various ways. The most common transformation achieved with such devices is to focus or defocus light, using diffractive waveplate structures of circular or cylindrical symmetry. A major advantage of such lenses and mirrors is that the manipulation of light with a diffractive waveplate lens or mirror requires a component thickness of typically only a few micrometers, whereas with a conventional lens or mirror made with conventional materials, thicknesses thousands of times greater are typically required. System design approaches that take advantage of this inherent advantage of lenses and mirrors based on diffractive waveplates can potentially result in products that are lighter weight, smaller size, and lower cost than products that are based on conventional optical components.

A list of components from the figures will now be described.

101 diffractive waveplate lens
102 diffractive waveplate lens
201 monochromatic laser beam
202 quarter-wave plate
203 plano-convex lens
204 plano-convex lens
205 birefringent layer
206 quarter-wave plate
207 light beam
208 photoalignment layer
209 substrate
301 incident linearly-polarized beam
302 diffractive waveplate lens
303 output beam
304 alignment layer
305 substrate
401 collimated light beam
402 single diffractive lens
403 focused beam output
404 coaxial diffractive waveplate
405 output beam
406 focus
501 lens
601 circular lens
602 transparent optical element
603 concave lens
604 birefringent liquid crystal layer
605 concave curved surface
606 alternative lens assembly
607 substrate
608 optical element
609 birefringent liquid crystal layer
610 surface
611 discontinuities
701 linearly-polarized, collimated monochromatic incident beam
702 half-wave plate
703 polarizing beam splitter
704 linearly polarized beam
705 linearly polarized beam
706 mirror
707 mirror
708 lens
709 polarizing beam combiner
710 quarter wave plate
711 alignment layer
712 substrate
901 linearly polarized incident beam
902 first quarter-wave plate 903 alignment layer
904 transparent substrate
905 second quarter wave plate
906 lens
907 mirror FIG. 1 illustrates prior art in the structure of a diffractive waveplate lens 101. The lens illustrated in FIG. 1 has circular symmetry, such that the optical axis orientation depends only on radial distance from the center of the lens. The optical phase shift Φ(r) imposed on the transmitted wavefront is given by the following formula:

$$\Phi(r) = \pm \frac{\pi r^2}{f \lambda} \qquad (I)$$

where λ is the wavelength of the radiation, f is the focal length of the waveplate lens for one of the two circular polarizations of light, and r is the radial distance from the center of the lens.

The sign of the phase shift indicated in formula (I) for the optical phase shift imposed by a diffractive waveplate lens depends on the handedness of the polarization of the light incident on said lens. The optical phase shift has one sign for light of one circular polarization, and the other sign for the other circular polarization. For light that is incident from the same side from which the lens is viewed in FIG. 1, the sign in formula (I) is negative for left hand circularly polarized (LHCP) light, and positive for right hand circularly polarized (RHCP) light. Therefore, this light is converged for LHCP light, and diverged for RHCP light. For the examples given below, it will be assumed that the polarization of the beam that is incident on each diffractive waveplate lens is such that the beam is converged, not diverged, by the lens.

The optical phase shift given in formula (I) is produced by varying the orientation of the optical axis. The local optical phase shift Φ(r) is related to the angle α(r) that the optical axis makes with the x axis (one of the axes transverse to the optical axis of the lens) by the following formula:

$$\Phi(r) = \pm 2\alpha(r) \qquad (II)$$

The orientation of the optical axis relative to the two transverse axes of the diffractive waveplate lens is shown at 102 in FIG. 1.

Figure 2:
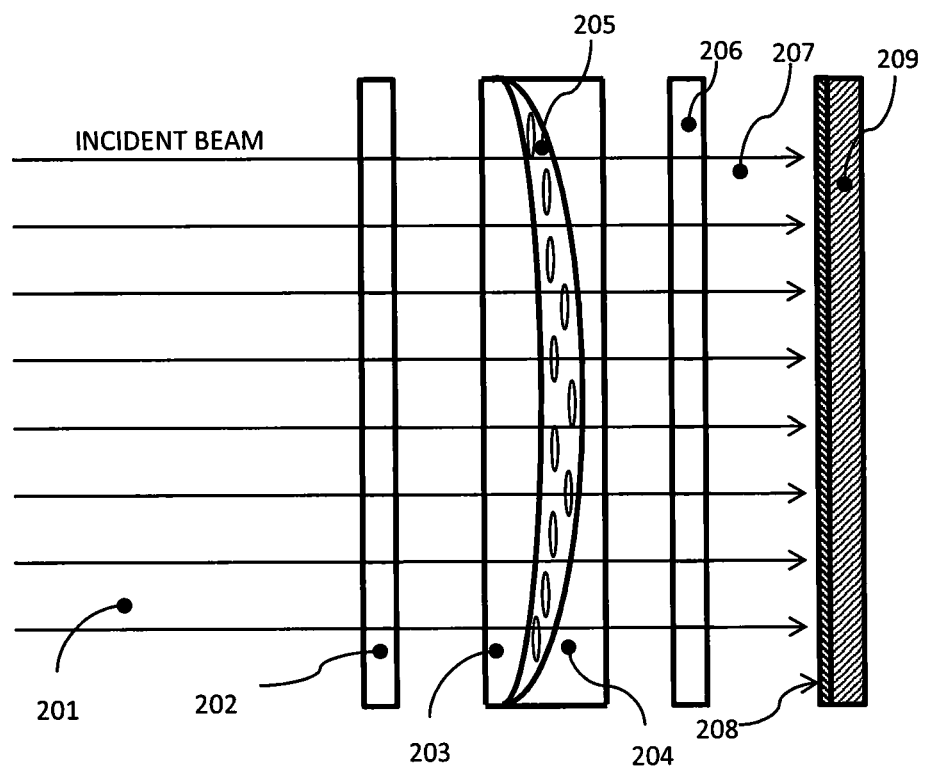
FIG. 2 shows a prior art method of forming the alignment layer that establishes the optical axis orientation in a diffractive waveplate lens. In this prior art method, a birefringent lens is used to modulate the orientation of the electric field in a linearly polarized optical beam, which in turn produces the alignment layer upon which the diffractive waveplate lens is deposited.

A typical method used in creation of the optical axis pattern over the area of the lens illustrated in FIG. 1 and described mathematically in formulas (I) and (II) using prior art techniques is illustrated in FIG. 2, as described and shown, for example, in U.S. patent application Ser. No. 14/214,375 filed Mar. 14, 2014, which claims the benefit of priority to U.S. Provisional Patent Application Ser. No. 61/801,251 filed Mar. 15, 2013, to Tabirian et al. entitled "Waveplate Lenses and Methods for Their Fabrication," which is co-assigned to the same assignee as the subject invention, and which are both incorporated by reference in their entirety.

The purpose of the optical setup shown in FIG. 2 is to create a light beam with spatially modulated linear polarization in order, in turn, to photoalign an alignment layer 208. In FIG. 2, a collimated linearly-polarized input monochromatic laser beam 201 (for example, an argon-ion laser beam with a wavelength of 488 nm) is incident on a quarter-wave plate 202. The electric field of the input linearly polarized beam 201 is parallel to the optical axis of the liquid crystal in the layer 205 of birefringent material. The optical axis of the quarter-wave plate 202 is oriented at 45° to the electric field in the incident beam 201, so therefore, the beam is converted by the quarter-wave plate 202 from linear polarization to circular polarization. This circularly polarized beam then passes through a lens assembly consisting of a plano-convex lens 203 and a plano-concave lens 204, with a birefringent layer 205 between lens 203 and lens 204.

The birefringent layer 205 is typically a nematic liquid crystal that has been uniformly aligned to produce the desired birefringent properties. The overall structure consisting of plano-convex lens 203, plano-concave lens 204, and birefringent layer 205 can be replaced by a single lens formed from a solid birefringent material, such as a birefringent crystal. The overall structure consisting of quarter-wave plate 202, plano-convex lens 203, plano-concave lens 204, birefringent layer 205, and quarter-wave plate 206 forms a spatial light polarization modulator (SLPM) such that the light beam 207 exiting this structure has spatially-modulated linear polarization in a pattern such as is described in FIG. 1 and formula (II).

The photoalignment layer 208, on substrate 209, is comprised for example of PAAD series photoalignment material layers (Beam Engineering for Advanced Measurements Co.). After creation of the alignment layer, multiple monomer layers of nematic liquid crystal are deposited over the alignment layer, then polymerized, for example, by exposure to unpolarized ultraviolet radiation. Additional layers are deposited and polymerized until the total thickness of the polymerized liquid crystal results in one-half wave of optical retardation at each lateral position on the lens at the desired operating wavelength. Each of the monomer layers align with the previous layer, and since the first monomer layer that is applied aligns with the alignment layer 208 itself, the entire structure is aligned to the alignment layer 208.

Although the method of fabrication of diffractive waveplate lenses illustrated in FIG. 2 can be used to create lenses with a wide variety of diameters, focal lengths, and minimum grating spacings, there are limitations to this technique due, for example, to an upper limit on the thickness of the birefringent layer 205 in FIG. 2. The present invention allows the fabrication of diffractive waveplate lenses of greater diameter for a given focal length, and shorter focal length for a given diameter, than the technique illustrated in FIG. 2.

The limitations of the technique illustrated in FIG. 2 for creating the alignment layer for a diffractive waveplate lens typically show up as imperfections in the lens, such that the optical axis does not comply with formula (I) with sufficient accuracy for specific applications. One of the reasons that these imperfections become more severe as the focal length becomes shorter is that the thickness of the birefringent layer 205 in FIG. 2 becomes greater as the focal length of the lens for which the alignment layer 208 is being written becomes shorter, and as the diameter of said lens increases. For example, to a good approximation, the thickness t of the birefringent layer 205 in FIG. 2 is given by the following formula:

$$t = \frac{k \lambda_0 D^2}{16 \pi \Delta n f} \qquad (III)$$

In formula (III), t is the greatest thickness of the birefringent layer for any transverse location within the active diameter of the birefringent lens; k is the wavenumber of the radiation to be focused by the waveplate lens to be fabricated with the alignment layer created using the birefringent lens; $\lambda_o$ is the wavelength of the radiation used to write the alignment layer (i.e. the wavelength of beams 201 and 207 in FIG. 2); D is the diameter of lenses 203 and 204 in FIG. 2, of the alignment layer 208 in FIG. 2, and of the waveplate lens that will be fabricated with the alignment layer 208; $\Delta n=(n_e-n_o)$ is the difference between the indices of refraction for the ordinary and extraordinary axes of the birefringent layer 205 in FIG. 2; and f is the effective focal length at wavelength $2\pi/k$ of the waveplate lens that is to be created using the alignment layer 208.

As is evident from formula (III), the required thickness t of the birefringent layer 205 in FIG. 2 increases as the diameter D increases, and it also increases as the focal length f is reduced. From formula (III), it follows that an upper limit on the thickness t of the birefringent layer 205 in FIG. 2 results in limits on the diameter D and the effective focal length f of lenses that can be fabricated from alignment layers created by the means illustrated in FIG. 2. The present invention relates to methods that can be used to overcome these limitations.

The fundamental reason that there is an upper limit on the thickness t of the birefringent layer 205 in FIG. 2 relates to the technical problem of aligning the liquid crystal acting as a birefringent film 205 along the same transverse axis throughout the volume of this layer. The liquid crystal molecules tend to become misaligned as the distance to the nearest surface of either the plano-convex lens 203 or the plano-concave lens 204 increases.

Figure 3:
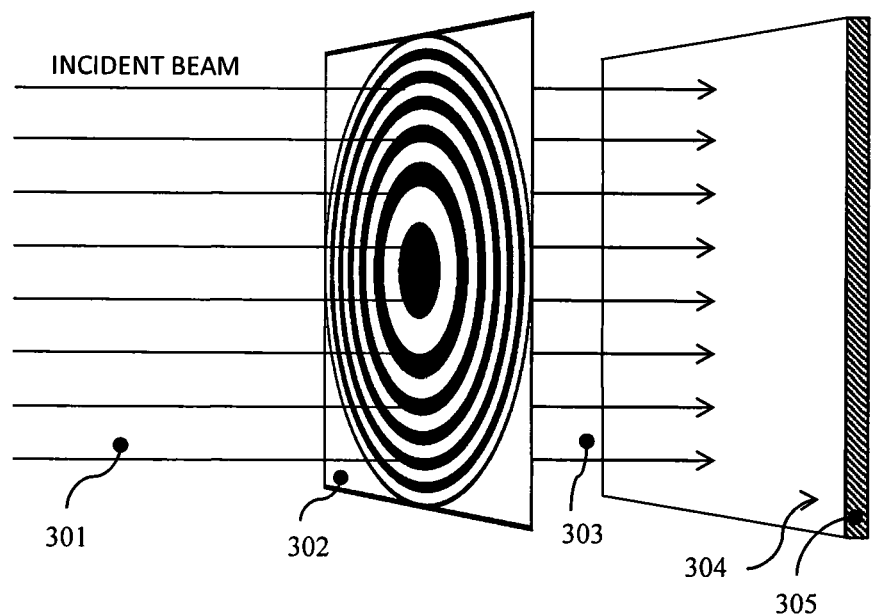
FIG. 3 shows a first preferred embodiment of the present invention in which a first diffractive waveplate lens is used to write the alignment layer needed to fabricate a second diffractive waveplate lens. When the alignment layer is written as shown in FIG. 3, the replica diffractive waveplate lens created with the resulting alignment layer will have half the focal length, and half the minimum grating spacing, of the template lens used to create the alignment layer.

One method of fabricating a diffractive waveplate lens with larger diameter and/or shorter focal length than is achievable with the technique illustrated in FIG. 2 is the lens replication technique shown in FIG. 3. In both FIG. 2 and FIG. 3, an incident linearly-polarized beam (201 in FIG. 2; 301 in FIG. 3) is processed by an optical system in order to create a pattern of linear polarized light in an output beam (207 in FIG. 2; 303 in FIG. 3) that is then used for photoalignment of an alignment layer on a substrate (alignment layer 208 on substrate 209 in FIG. 2; alignment layer 304 on substrate 305 in FIG. 3).

The difference between the methods shown in FIG. 2 and FIG. 3 used to create the alignment layer (208 in FIGS. 2 and 304 in FIG. 3) is in the way that the optical beam used to create the photoalignment layer is formed. In FIG. 2, the structure that comprises the spatial light polarization modulator (SLPM) consists of quarter-wave plate 202, plano-convex lens 203, plano-concave lens 204, birefringent layer 205, and quarter-wave plate 206. All of these elements are replaced by a single diffractive waveplate lens 302 in FIG. 3.

The reason that the lens replication method shown in FIG. 3 for creating a photoalignment layer allows the fabrication of lenses with shorter focal length and finer grating spacing than the method shown in FIG. 2 is that the focal length of a lens created from the alignment layer 304 shown in FIG. 3 will be half the focal length of the lens used to create it. For example, if the effective focal length of diffractive waveplate lens 302 in FIG. 3 is f, then the effective focal length of the lens made from alignment layer 304 in FIG. 3 will be f/2.

To see why the focal length of a lens created with the alignment layer 304 in FIG. 3 is half the focal length of the diffractive waveplate lens 302 used to create the alignment layer, it is useful to define $f_1$, $\alpha_1(r)$, and $\Phi_1(r)$ as the focal length, optical axis orientation as a function of radius r, and output optical phase as a function of radius r of waveplate lens 302 in FIG. 3, respectively; and $f_2$, $\alpha_2(r)$, and $\Phi_2(r)$ as focal length, optical axis orientation versus radius r, and output optical phase versus radius r of a waveplate lens created from the alignment layer 304 in FIG. 3. According to formula (II), the derivative of the optical phase $\Phi_1(r)$ with respect to radius r at the output from the diffractive waveplate lens 302 in FIG. 3 is twice the derivative with respect to r of the optical axis angle $\alpha_1(r)$ of that same waveplate:

$$\Phi_1(r)=2\alpha_1(r) \quad \text{(IV)}$$

Formula (IV) is the same as formula (II), but applied specifically to waveplate 302 in FIG. 3. The relationship between the optical axis orientation $\alpha_2(r)$ written into the alignment layer 304 in FIG. 3 to the optical phase $\Phi_1(r)$ at the same transverse radius in waveplate lens 302 in FIG. 3 is as follows:

$$\alpha_2(r)=\Phi_1(r) \quad \text{(V)}$$

From formulas (IV) and (V) it follows that $$\alpha_2(r)=2\alpha_1(r) \quad \text{(VI)}$$

Applying formula (II) to the waveplate lens created from the alignment layer 304 of FIG. 3, $$\Phi_2(r)=2\alpha_2(r) \quad \text{(VII)}$$

Formulas (II), (VI), and (VII) imply that $$\Phi_2(r)=2\Phi_1(r) \quad \text{(VIII)}$$

Combining formulas (I) and (VIII) results in the following: $f_2=f_1/2$. That is, as previously stated, the focal length of a diffractive waveplate lens fabricated using an alignment layer created by another diffractive waveplate lens is half the focal length of the lens used to make the alignment layer.

The creation of the alignment layer by the method illustrated in FIG. 3 is one step in a process of diffractive waveplate lens replication, i.e. creation of one diffractive waveplate lens using another such lens as a template. As explained above, the replicated lens has the same diameter as the lens from which it is replicated, but its focal length is half that of the lens from which it is replicated. The spacing of complete cycles of optical axis orientation modulation is half as large in the replicated lens as it is in the lens from which it is replicated at each transverse location on the two lenses.

Figure 4A:
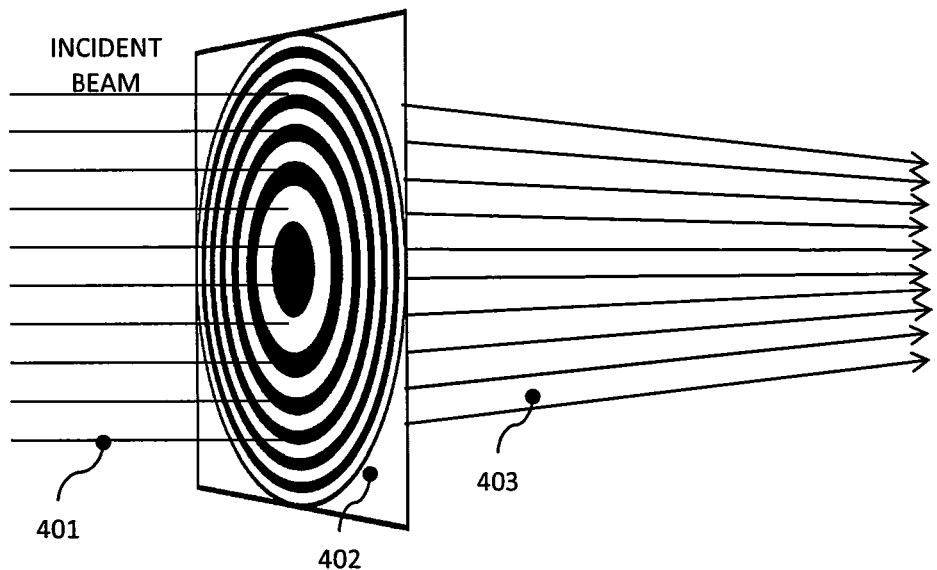
FIG. 4A illustrates typical ray paths through a single waveplate lens. The individual ray paths are deviated towards a distant focal point, not shown in the figure.

An alternative method to achieve shorter focal lengths than can be achieved directly by the method illustrated in FIG. 2 is illustrated in FIG. 4. In this method, multiple diffractive waveplate lenses are stacked or cascaded in order to achieve larger diameter and/or shorter focal length than can be achieved with a single diffractive waveplate lens. In FIG. 4A, a single diffractive waveplate lens 402 takes an incident collimated light beam 401 and produces as output a focused beam 403. Due to an upper limit $t_{max}$ on the thickness t of the birefringent layer (205 in FIG. 2) used in fabricating the lens 402 in FIG. 4A, the focal length f of the diffractive waveplate lens fabricated using the alignment layer 208 in FIG. 2 is constrained, according to formula (III), as follows:

$$f \geq \frac{k\lambda_0 D^2}{16\pi\Delta n t_{max}} \quad \text{(IX)}$$

Figure 4B:
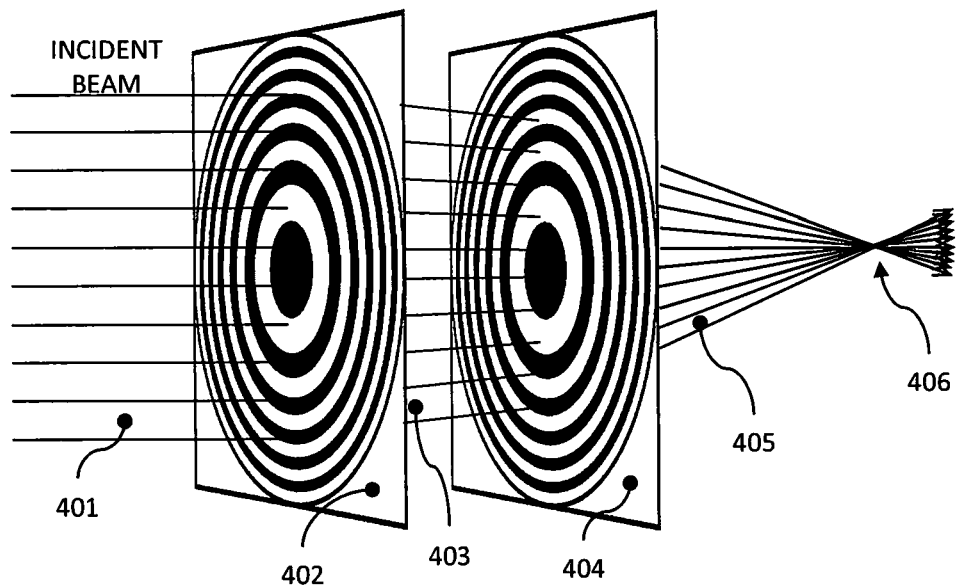
FIG. 4B illustrates typical ray paths through a cascade of two waveplate lenses. Because the focal powers of the two cascaded waveplate lenses add, the focal point of the combination of the two lenses is much closer to the lens combination than the focal point in the configuration of FIG. 4A is to the single diffractive waveplate lens shown in that figure.

The lower limit specified in formula (IX) on the focal length of the diffractive waveplate lens fabricated using an alignment layer fabricated as illustrated in FIG. 2 can be overcome by cascading or stacking multiple diffractive waveplate lenses as illustrated in FIG. 4B. In FIG. 4B, a first diffractive waveplate lens 402 is followed immediately by a coaxial diffractive waveplate lens 404. The collimated beam 401 incident on lens 402 of focal length f produces a converging beam 403 that converges towards a focal point at a distance f from lens 402. Said converging beam 403 in FIG. 4B is then immediately incident an additional diffractive waveplate lens 404, also of focal length f. The result of this cascading of two diffractive waveplate lenses 402 and 404 is that the output beam 405 from waveplate lens 404 comes to a focus at 406, a distance f/2 from lens 404.

With conventional lenses, each one of which consists for example of axially symmetric glass elements with one or more curved surfaces, cascading or stacking two or more lenses is common in the design and manufacturing of optical systems, but inherently has a greater weight and cost impact than cascading or stacking two or more waveplate lenses. This is because for any such conventional lens, the axial thickness of each lens is a significant fraction of the diameter of the lens element. For diffractive waveplate lenses, on the other hand, since each lens will have an axial thickness of only a few micrometers, a composite lens consisting of two or more waveplate lenses will still have a thickness that is only a very small fraction of the diameter of the composite lenses, since in the vast majority of applications, the diameter of the lens will be at least a few millimeters.

Therefore unlike for the case an assembly of multiple conventional lenses axially cascaded or stacked, a cascade or stack of waveplate lenses would not be expected to be significantly more expensive, or to cost significantly more in production quantities, than a single diffractive waveplate lens. Therefore the ability to create a short focal length composite lens, consisting of two or more cascaded diffractive waveplate lenses, as illustrated in FIG. 4B, is potentially of great value in overcoming possible constraints given, for example, by formula (IX), on the focusing power of a single diffractive waveplate lens.

The minimum acceptable spacing between the individual diffractive waveplate lenses of a composite structure such as is illustrated in FIG. 4B is zero. That is, a monolithic sandwich structure of two or more such diffractive waveplate lenses in direct contact with each other is one of the possible configurations in which the focal powers of the lenses would simply add together. The structures covered by this disclosure include, but are not limited to, such a composite monolithic multilayer diffractive waveplate structure.

As noted previously in this disclosure, the examples described in this disclosure of the processing of optical beams by one or more diffractive waveplate lenses are for the case in which the input beam is polarized such that the effect of each diffractive waveplate lens is to make the beam more convergent. To clarify this condition, a specific example of the requirements imposed by this condition is illustrated in FIG. 5. An important point concerning such lenses is that in general, the effect of a diffractive waveplate lens on a collimated light beam depends on the direction from which the light beam is incident on the lens.

Figure 5A:
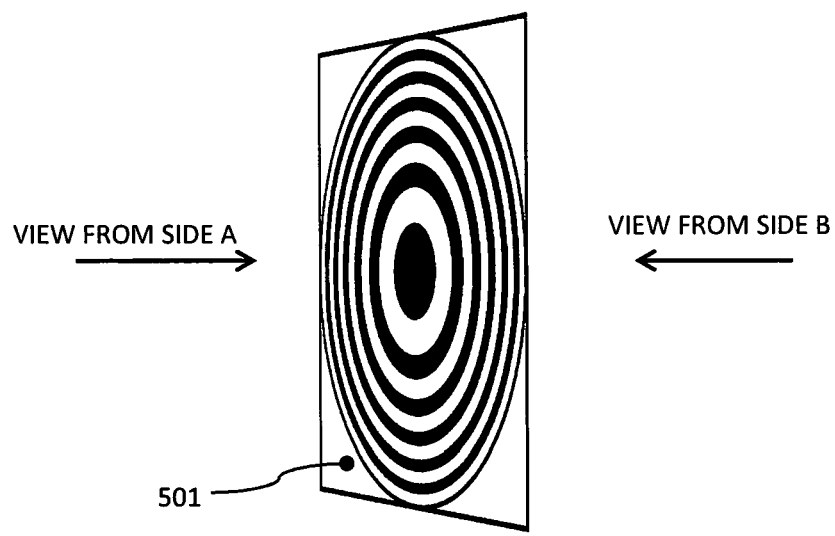
FIG. 5A illustrates a waveplate lens, and shows the two directions along the axis of the lens from which the lens can be viewed.
Figure 5B:
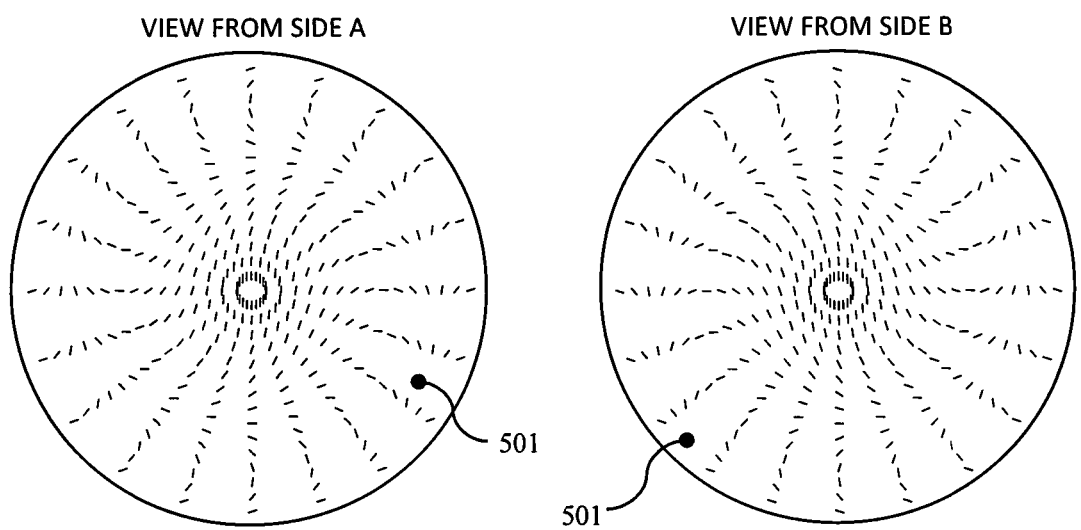
FIG. 5B illustrates the dependence of optical axis orientation in a waveplate lens, as viewed from either of the two possible directions along the optical axis of the lens.

For example, a left hand circularly polarized (LHCP) beam could be incident on the diffractive waveplate lens from either Side A or Side B of lens 501 in FIG. 5A. It is assumed that the dependence of optical axis orientation on radial distance from the center of the lens is as illustrated in FIG. 5B. In that case, a LHCP beam incident from Side A would be converged by the lens, and a LHCP beam incident from Side B would be diverged by the lens. Assuming that the input beam 401 in FIG. 4B is left-hand circularly polarized, and that the optical axis orientation of lenses 402 and 404 in FIG. 4B are as shown in FIG. 5B, it follows that input beam 401 in FIG. 4B must be incident on lens 402 from Side A, and beam 403 must be incident from Side B of lens 404, in order for both lens 402 and lens 404 to converge the beam.

This is because one of the effects of any diffractive waveplate lens of the type discussed in this disclosure is that it inverts the handedness of the circular polarization of any beam of light that is transmitted through the lens. Therefore, if lenses 402 and 404 are identical, then lens 404 must be rotated 180 degrees about any transverse axis (i.e. any axis perpendicular to the axis of the input optical beam) relative to lens 402 in order for both lenses to converge the beam as shown in FIG. 4B.

Although the illustrations in FIGS. 3, 4, and 5 are for the case in which the diffractive element is a diffractive waveplate lens, it will be clear to any skilled in the art that the same principles can be applied to diffractive waveplate mirrors. For example, if the alignment layer 304 in FIG. 3 is used to fabricate a diffractive waveplate mirror instead of a diffractive waveplate lens, the mirror so fabricated will have a focal length half as large as that of the diffractive waveplate lens 302 used to create the alignment layer 304.

Figure 6:
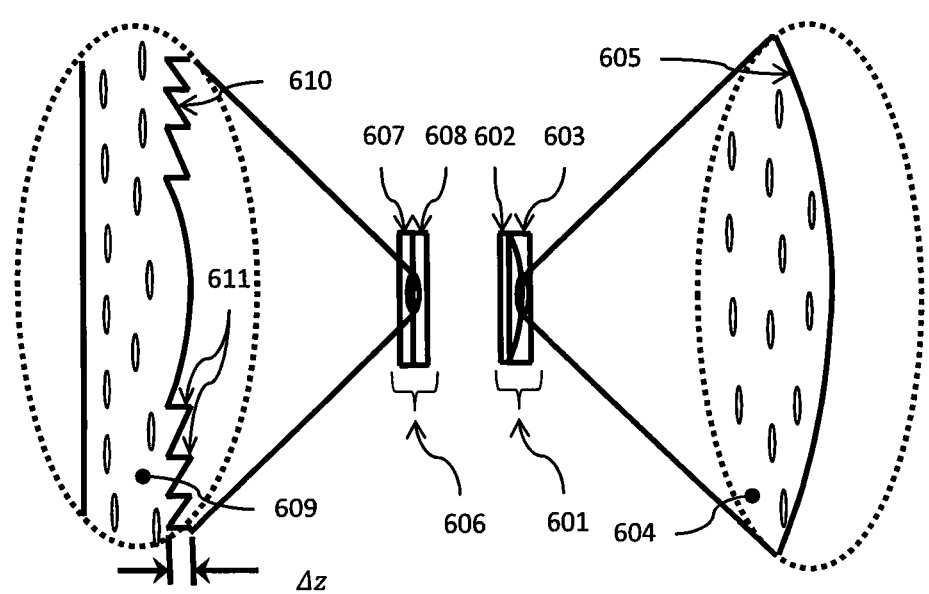
FIG. 6 shows a comparison of birefringent lenses for use in creating the alignment layer that is in turn used to make diffractive waveplate lenses, showing in particular a conventional birefringent lens with continuous curved surfaces, and an alternative birefringent lens with discontinuities in one of the surfaces bounding the birefringent medium.

As noted previously in the discussion of FIG. 2, there is an upper limit on the thickness of the birefringent layer 205 in FIG. 2. As this layer thickness increases, the precision with which the optical axis orientation of the alignment layer 208 matches the design is degraded. These limitations result in limitations on the focal length, diameter, and optical quality of the lenses fabricated using the alignment layer 208 of FIG. 2. An alternative to the lens structure shown in FIG. 2 that overcomes these limitations is shown in FIG. 6. The circular lens assembly 601, a side view of which is shown in FIG. 6, is the same as the assembly consisting of convex lens 203, birefringent layer 205, and concave lens 204 of FIG. 2, except that the convex element 602 of assembly 601 is the limiting case of a convex lens whose curved surface has infinite radius. Thus, the lens assembly 601 consists of a transparent optical element 602 with two parallel flat surfaces, a concave lens 603 with concave curved surface 605, and a birefringent liquid crystal layer 604 between these two elements. The alternative lens assembly 606 of FIG. 6 also employs a substrate 607 with two flat surfaces, but the other optical element 608 bounding the birefringent liquid crystal layer 609 consists of a surface 610 which includes discontinuities 611 in its structure.

The axial depth Δz of the discontinuities 611 satisfies the following formula:

$$\Delta z(n_e - n_0) = m\lambda_0 \quad (X)$$

where $n_e$ and $n_o$ are respectively the extraordinary and ordinary indices of refraction of the birefringent medium 609, $\lambda_0$ is the wavelength of the radiation that will be used to write the alignment layer, and m is an integer. The overall structure of the surface with discontinuities 611 is therefore that of a Fresnel lens. Provided that the axial depth Δz of the discontinuities 611 satisfies formula (X), there will be no discontinuities in the optical axis orientation α(r) over the surface of the alignment layer that is created with the assembly 606 of FIG. 6.

The advantages of using an assembly 606 as an alternative to an assembly 601 in FIG. 6 in creating an alignment layer to be used as a basis for fabricating a waveplate lens are that (1) the constraints on the diameter D and focal length f indicated by formula (IX) are overcome, and (2) the tolerances on optical axis orientation versus radius of the alignment layer created with structure 606, and therefore the tolerances on the optical properties of the diffractive waveplate lens created with said alignment layer, are potentially much tighter than if a structure such as the one illustrated at 601 in FIG. 6 is used to create said alignment layer. This is because the thickness of the birefringent layer 609 of structure 606 can be orders of magnitude smaller than the thickness of the birefringent layer 604 of structure 601 for the same radial dependence of optical axis orientation.

The lenses 607 and 608 in assembly 606 of FIG. 6 perform only the function of providing a space in which to confine the birefringent liquid crystal 609. The only part of assembly 606 that is needed in order to produce the desired optical axis orientation modulation in the alignment layer that will be created with this assembly is the birefringent layer 609. Therefore, alternative approaches to providing this birefringent layer are possible, such as a thin crystalline birefringent layer with the same structure as the liquid crystal layer 609 of FIG. 6, on a supporting optical substrate made of an isotropic substrate such as glass.

Although the method of FIG. 6 is generally applicable to creating alignment layers for a wide range of waveplate lenses and mirrors, in some cases the availability of alternative methods is desirable. The use of the birefringent liquid crystal lens assembly 606 illustrated in FIG. 6 avoids the constraints on focal length and diameter inherent in the method illustrated in FIG. 2 and quantified in formula (IX), but some limitations are encountered when an assembly such as 606 in FIG. 6 is used to create an alignment layer for use in fabricating a diffractive waveplate lens or mirror. These limitations relate to imperfections in the alignment of the liquid crystal molecules in the presence of nearby physical discontinuities such as 611 in FIG. 6.

In addition, the fabrication of optical elements such as 608 in FIG. 6, incorporating a surface 610 with physical discontinuities 611, can be excessively expensive to design and fabricate. To avoid these problems with imperfect alignment of the liquid crystal molecules and the expense of fabricating complex optical elements, alternative methods for creation of the alignment layer are desirable.

An additional constraint in using the prior art method illustrated in FIG. 2, or either one of the two methods of the present invention illustrated in FIG. 3 and FIG. 6, is that all three of these methods require what can be termed proximity focusing of the light between the output surface of the master lens and the alignment layer that will be used to fabricate the replica lens or mirror. If the distance between the master lens and the alignment layer is too large, the quality of the resulting alignment is degraded because the local polarization degrades from linear to elliptical as distance from the master lens increases.

The maximum allowable distance $d_{max}$ from the master lens beyond which linearity of the polarization of light emerging from the master lens has degraded to an unacceptable degree is approximately $d_{max} \approx \Lambda^2/\lambda_0$, where $\Lambda$ is the local period of the grating structure of the master lens, and $\lambda_0$ is the wavelength of the light used to create the alignment layer. The requirement that the separation between the master lens and the alignment layer be less than $d_{max}$ places a lower limit on the achievable grating period due to practical limitations on how close together the master lens and the alignment layer for the replica lens can be placed.

Figure 7:
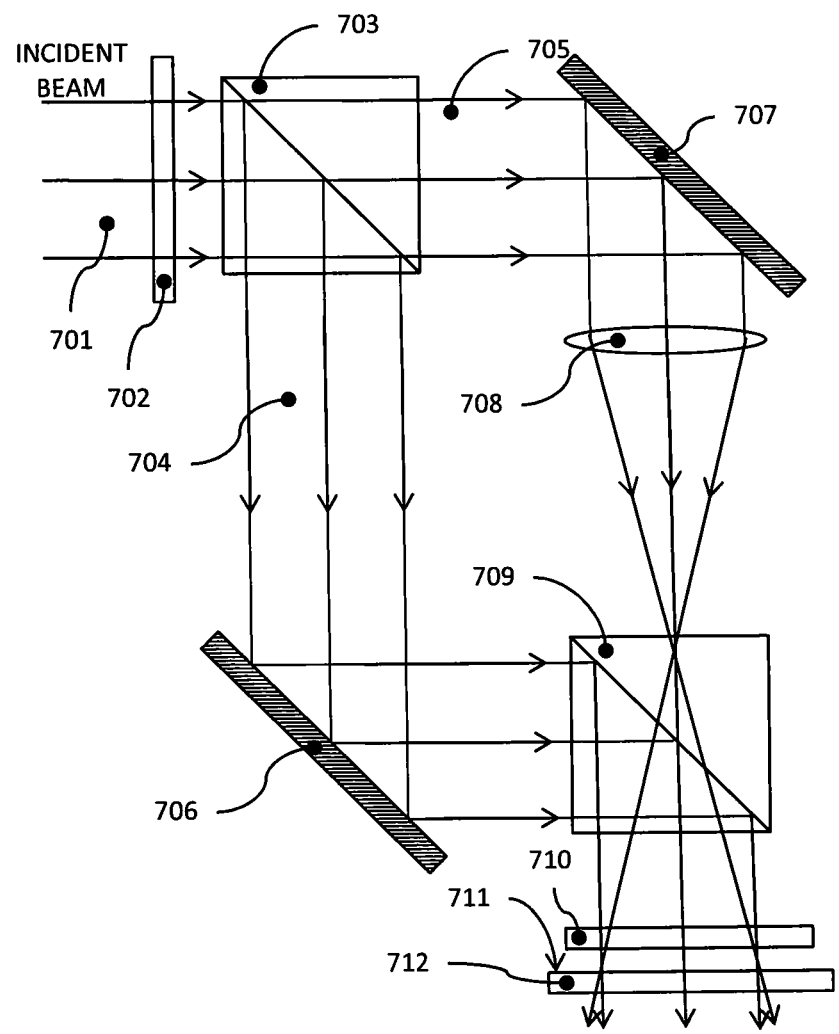
FIG. 7 illustrates an interferometric method for photoalignment, in which the path through the lens is separated from the reference path, for use in creation of an alignment layer to be used in fabrication of a diffractive waveplate lens or mirror.
Figure 8:
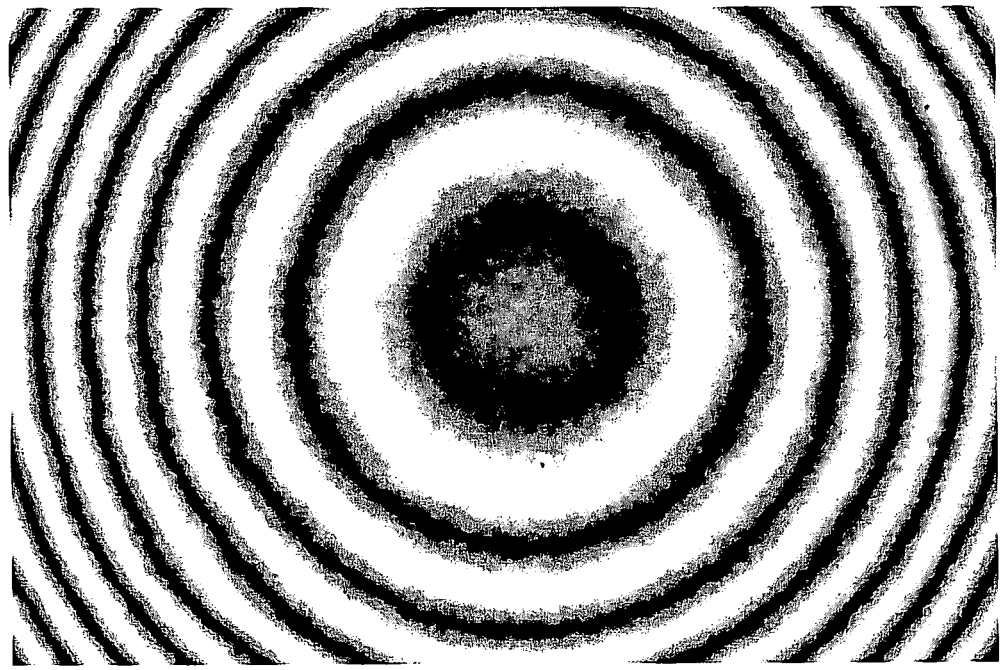
FIG. 8 shows a photograph taken of the central part of a liquid crystal polymer diffractive waveplate lens for which the alignment layer was written with the apparatus illustrated in FIG. 7.

Two alternative methods of creating photoalignment patterns that overcome some of the limitations of the techniques illustrated in FIG. 2, FIG. 3, and FIG. 6 are illustrated in FIG. 7 and FIG. 8. With the method illustrated in FIG. 7, a linearly-polarized, collimated monochromatic incident beam 701 passes through a half-wave plate 702, thus providing a way to adjust the relative amplitudes of the two linearly-polarized beams 704 and 705 that are the result of splitting the input beam using polarizing beamsplitter 703. The polarized beam 704 reflects from mirror 706 and polarizing beam combiner 709 while the other polarized beam 705 reflects from mirror 707 then passes through lens 708. The two polarized beams are combined by the polarizing beam combiner 709, then both beams pass together through quarter-wave plate 710.

The interference between the two polarized beams at the alignment layer 711 on substrate 712 results in a single linearly-polarized beam whose orientation axis is spatially modulated to match the relative optical phase imposed between the two interfering beams by the lens 708. By appropriate adjustment of the relative amplitudes of the two interfering beams by means of rotation of half-wave plate 702 about the axis of the incident beam 701, ellipticity of the linearly polarized output beam at alignment layer 711 can be eliminated or minimized.

A diffractive waveplate lens fabricated with an alignment layer 711 created as illustrated in FIG. 7 will have the same focal length as the lens 708 used to create the alignment layer. A diffractive waveplate mirror fabricated with an alignment layer 711 created as illustrated in FIG. 7 will have the same focal length as the lens 708 used to create the alignment layer.

Because the lengths of the two paths through the interferometer illustrated in FIG. 7 are nearly equal, the coherence length of the incident beam 701 can be relatively short and still produce the desired interference pattern at the alignment layer 711. If the coherence length of the monochromatic input beam is sufficiently long, an interferometer configuration such as the one shown in FIG. 8 can also be used to photoalign the alignment layer that will later be used to create a diffractive waveplate lens or mirror. FIG. 8 is a photograph of a liquid crystal polymer lens between crossed polarizers. The lens was fabricated using an alignment layer that was photoaligned with the system of FIG. 7.

Figure 9:
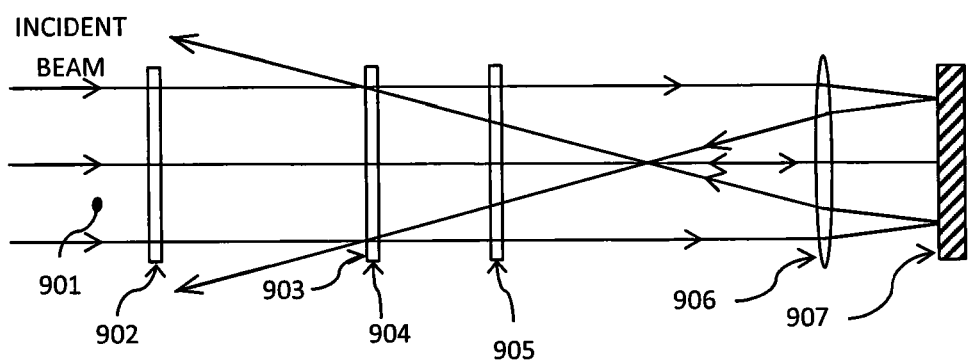
FIG. 9 illustrates an interferometric method for photoalignment, in which the path through the lens is co-aligned with the reference path, for use in creation of an alignment layer to be used in fabrication of a diffractive waveplate lens or mirror.

In FIG. 9, a monochromatic, linearly-polarized incident beam with coherence length long compared with twice the axial separation between alignment layer 903 and mirror 907 is incident on a quarter-wave plate 902. The quarter-wave plate 902 is oriented about the optical axis such that it converts linearly polarized incident beam 901 to circular polarization. The resulting circularly-polarized beam is transmitted through the alignment layer 903 on transparent substrate 904, then through a second quarter-wave plate 905 and lens 906, before being reflected by mirror 907. The beam reflected from mirror 907 then retraces its path through lens 906, quarter-wave plate 905, and substrate 904, finally reaching alignment layer 903 where it interferes with the incident beam to form a linearly-polarized sum beam whose orientation axis α(r) depends on the distance r from the optical axis as described by formulas (I) and (II).

The focal length of a waveplate lens created from the alignment layer 903 created with the setup shown in FIG. 9 will be half the focal length of the lens 906 used in creating the alignment layer. This is due to the fact that the beam passes through the lens twice before it passes through the alignment layer 903 for the second time.

Figure 10:
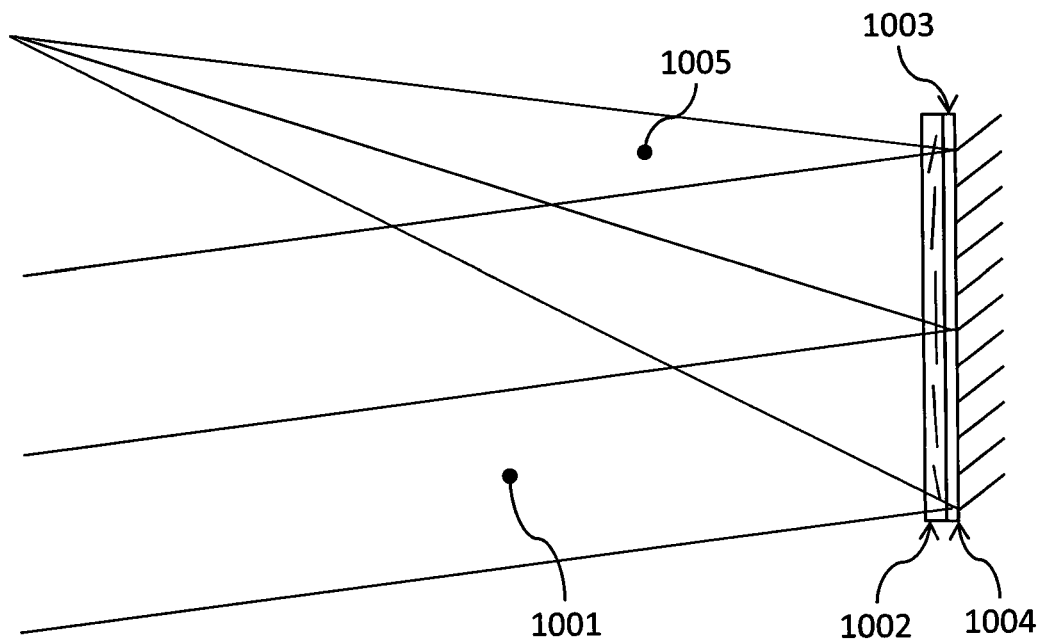
FIG. 10 shows the optical function of a flat diffractive waveplate mirror with focusing power.

Methods of the present invention that do not require transmission of the alignment light through the substrate onto which the photoalignment material has been deposited can be used as substrates for fabrication of flat diffractive waveplate mirrors with focusing power, as well as substrates for fabrication of thin-film diffractive waveplate lenses. In particular, the methods of creating patterned photoalignment layers disclosed in FIG. 3 and FIG. 7 can be used to create patterned photoalignment layers as a basis for fabricating flat diffractive waveplate mirrors that have focusing power. The optical function of such a flat diffractive waveplate mirror with focusing power is shown in FIG. 10. The form of such a flat mirror after deposition of the diffractive polymer consists of a mirror surface 1004 coated with a quarter waveplate 1003 and a diffractive waveplate lens coating 1002. A circular polarized collimated light beam 1001 is thus reflected from the system as a focused beam 1005.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as can be suggested by the teachings herein are particularly reserved especially as they fall within the breadth and scope of the claims here appended.

We claim:

1. A method for creating an alignment layer usable for fabricating a diffractive waveplate lens, the method comprising the steps of:
    generating a monochromatic, linearly-polarized incident beam of radiation;
    converting the linearly-polarized radiation to circular polarization with a first quarter wave plate;
    providing a refractive lens assembly containing a birefringent layer;
    producing a selected nonlinear dependence of optical retardation on radial distance from the center of said assembly, with the circularly polarized light from the first quarter-wave plate incident on said assembly;
    producing discontinuities of an integral number of waves in the optical path difference with said birefringent layer;
    converting beam output of the assembly from circular polarization to linear polarization with a second quarter wave plate; and
    providing a thin film of material that is photoaligned by the linearly polarized output of the second quarter-wave plate.

2. The method of claim 1, in which the birefringent layer consists of a layer of liquid crystal between two solid substrates, one of which is flat, and the other of which has physical discontinuities that result in optical path difference discontinuities of an integer multiple of wavelengths; with a liquid crystal layer aligned in the same direction throughout said birefringent layer.

3. The method of claim 1, in which the birefringent layer consists of a thin solid crystalline layer on a solid optical substrate with an optical axis of the birefringent layer aligned in a same direction throughout the birefringent layer.

4. A method for creating an alignment layer usable for fabricating a diffractive waveplate lens, the method comprising the steps of:
    generating a monochromatic, linearly-polarized incident beam of radiation;
    providing a half-wave plate to allow adjustment of the fraction of the input beam that is propagated into each path in an interferometer;
    providing a combination of polarizing beamsplitters and mirrors comprising an interferometer, such that incident radiation is divided between the two paths of the interferometer, then recombined at an output of the interferometer, with a fraction of radiation propagating into each arm of the interferometer being adjusted by rotation of the half-wave plate about the axis of the incident beam;
    providing an optical element which includes a lens placed into one arm of the interferometer;
    providing a quarter-wave plate to convert the combined beam output from said interferometer from circular polarization to linear polarization; and
    providing a thin film of material that is photoaligned by the linearly polarized output of said second quarter-wave plate.

5. The method of claim 4, wherein the lens has circular symmetry.

6. The method of claim 4, wherein the lens has cylindrical symmetry.

7. A method for creating an alignment layer usable for fabricating a diffractive waveplate lens, the method comprising the steps of:
    generating a monochromatic, linearly-polarized incident beam of radiation;
    rotating a first quarter-wave plate about an optical axis of the incident beam so that the incident beam is converted from linear to circular polarization;
    providing an alignment layer consisting of a material susceptible to photoalignment by linearly polarized radiation, on a transparent substrate;
    providing a second quarter-wave plate for converting the incident beam from circular polarization to linear polarization, and for converting a reflected beam from linear polarization to circular polarization; and
    providing a lens and mirror for reflecting the linearly-polarized beam and imposing an optical phase shift that depends on a radial coordinate.

8. The method of claim 7, wherein the lens has circular symmetry.

9. The method of claim 7, wherein the lens has cylindrical symmetry.

* * * * *